Figure 1:
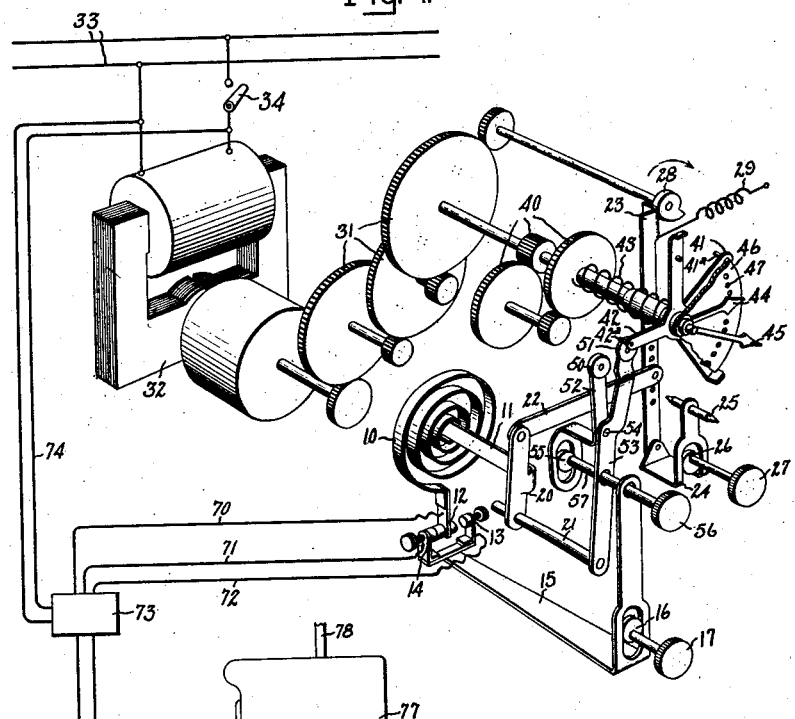

June 17, 1941.  D. C. PRINCE  2,246,186
HEATING CONTROL
Filed Aug. 1, 1933

Inventor:
David C. Prince,
by Harry E. Dunham
His Attorney.

Patented June 17, 1941

2,246,186

UNITED STATES PATENT OFFICE 2,246,186

HEATING CONTROL

David C. Prince, Swarthmore, Pa., assignor to General Electric Company, a corporation of New York Application August 1, 1933, Serial No. 683,147

17 Claims. (Cl. 236—46)

This invention relates to heating control, more particularly to house heating thermostat control although not necessarily limited thereto, and has for its principal object the provision of an improved heating control method and apparatus whereby more uniform temperatures may be maintained.

The ordinary house heating thermostat control is not entirely satisfactory because there is a considerable amount of lag in the response of the house temperature to the control of the thermostat. For example, with either a hot water or steam heating system when the thermostat starts the furnace up there is some delay in heating the boiler water to a useful temperature and still further delay before the house temperture is raised to the desired value. Likewise as soon as the temperature of the house comes up to the desired value at which the thermostat is set, this device shuts off the furnace, but the boiler water is already considerably hotter than necessary and the temperature of the house overruns. With the furnace shut off, the boiler water cools off so that very often before the house is cooled off to the point where the thermostat will again start the furnace, the heat is all gone from the radiators. Such overshooting and undershooting characteristics of ordinary house heating systems are quite well known and are due to what may be termed the heat increasing and heat decreasing inertia of the system.

Furthermore, all parts of the house heating system do not have the same inertia or rate of temperature response both up and down. Ordinarily the central parts of the house, on the lower floor particularly, are more sluggish than some exposed parts of the house so that the actual overshooting and undershooting temperature range in the exposed parts is quite large, in fact ordinarily is too large to be satisfactory.

In spite of all the thermostat control devices prior to the present invention, a situation similar to that outlined above usually exists in most thermostatically controlled house heating systems and is tolerated for want of something better. These unsatisfactory conditions are aggravated where the thermostat control is used on a coal fired furnace, which has a much larger inertia and necessarily requires considerably longer to respond to a change in draft than does an oil or gas heated furnace.

To overcome these heating inertia difficulties is the principal object of the improved heating control method and apparatus of the present invention. Broadly speaking, this is accomplished in accordance with the present invention by combining the thermostat with a timing device in such a way as to periodically operate the heating system through cycles having a frequency sufficiently high to neutralize or balance out the heating inertia effects. The timing device may be a continuously operating electric motor of the synchronous type such as now widely used in electric clocks and arranged to oscillate the thermostat setting periodically through the short cycles by means of a rotating cam mechanism.

In the preferred form of the invention, each high frequency cycle or oscillation normally includes an on and off period of operation for the furnace, i. e., a heat decreasing and a heat increasing period, and the thermostat in responding to the house temperature functions to vary inversely the relative length of these periods in accordance with the departure from a predetermined temperature. The arrangement preferably is such that at certain abnormal temperature limits, the improved control operates to maintain the furnace continuously either on or off.

Preferably provision is also made for enabling the cycling device to vary the temperature setting of the thermostat at predetermined times. In this way different day and night temperatures may be maintained automatically in the house.

Figure 3:
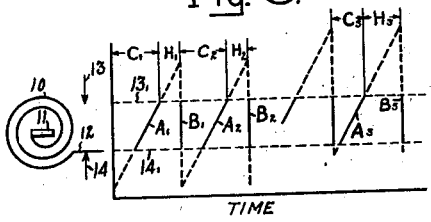
Figure 2:
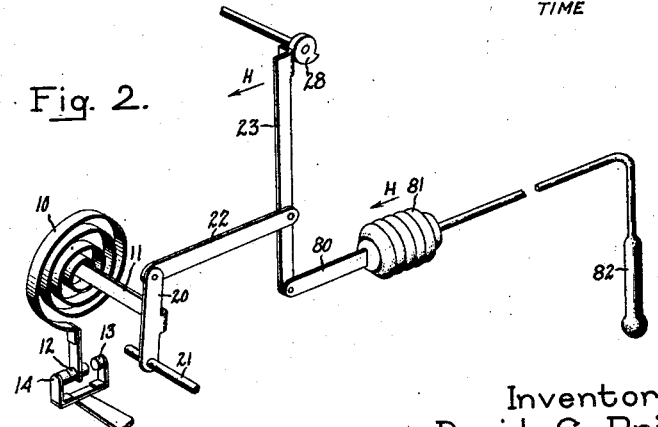

The accompanying drawing illustrates a preferred construction of the improved heating control of the present invention, Fig. 1 being a view of the device partly in perspective to show the operating relationship between the various parts of the cycling device and the thermostat and also diagrammatically showing the manner in which the control is connected to a typical house heating furnace. Fig. 2 is also a perspective view showing a modification of the device illustrated in Fig. 1 which may be adopted where it is desired automatically to keep the house slightly warmer in very cold weather than it is in mild weather, and Fig. 3 is a cycling diagram used in the explanation of the operation of the invention.

As shown in Fig. 1, the preferred form of improved heating control comprises the thermostat 10 which is to be located so as to be responsive to the house temperature which it is desired to maintain at a predetermined value. This thermostat 10 is shown as a bimetallic strip of well known construction wound in spiral form with the inner end thereof fixedly mounted on the support 11. The free end of the thermostatic strip 10 carries the electrical contact 12 which operates between the two spaced apart contacts 13 and 14. These contacts 12, 13, and 14 constitute the master control for the electrically controlled house heating furnace 77. When contact 12 engages contact 13, the furnace is started up. Hence this may be termed the heat increasing position of the control device. When contact 12 engages contact 14, the furnace is shut down, this being the heat decreasing position of the control.

The spaced apart contacts 13 and 14 are carried on the swinging support 15 so that the position of contacts 13 and 14 may be adjusted to vary the temperature setting of the thermostat 10 by turning the cam 16 which is provided with the manual adjustment knob 17.

The bent over portion 20 of the thermostat support 11 is pivotally mounted at its lower end on the shaft 21 and is pivotally connected at its upper end to the link 22 which in turn is connected to the cycling lever 23. The lower end of the lever 23 is pivotally mounted on the frame 24 which latter may be swung around the fixed pivot 25 to vary the amplitude of oscillation of the cycling lever 23 by turning the cam 26 provided with the manual adjusting knob 27. The upper end of the cycling lever 23 is biased into operating relation with the timing cam 28 by spring 29.

The cam 28 is driven through suitable speed reducing gear mechanism 31 by the continuously operating electric motor 32. The motor 32 as shown is of the well known self-starting synchronous type adapted to be connected to commercial alternating-current power lines 33 upon closure of the switch 34. This motor driving arrangement with its speed reducing gearing preferably is such as to rotate the cam 28 every half hour or other short period of time, depending upon the heating inertia of the house heating system.

In order to give automatic variation between the day and night temperature settings of the thermostat 10, the motor 32 is arranged to operate through the gearing 40 and the two adjustable arms 41 and 42. These arms are shown arranged to be frictionally driven through the spring 43 and provided with the setting hands 44 and 45 which cooperates with a dial 46 having a series of locking holes 47 for setting the times for changing day to night temperatures and vice versa as desired.

The change from the day to the night temperature setting of thermostat 10 and vice versa is accomplished by the pins 41a and 42a which are carried by the arms 41 and 42 respectively and cooperate with the rounded heads 50 and 51 of the day and night changeover levers 52 and 53 respectively. These levers are joined together near their center by the pin 54 so that the lever 52 may be adjusted to vary the differential between the day and night temperatures by turning the cam 55 which is provided with a manual adjusting knob 56. The main changeover lever 53 is pivotally mounted on the shaft 57 which connects the cams 55 and knob 56 and carries at its bottom end the pivot 21 upon which the thermostat supporting arm 11 is pivotally mounted. Suitable means (such as a friction spring or washer not shown) is provided for holding lever 53 in the day and night positions when operated thereto.

The master control contacts 12, 13, and 14 are shown connected by the conductors 70, 71, and 72 to the furnace control panel 73 to which power is supplied through the conductors 74 from the alternating-current lines 33 when the switch 34 is closed. The detailed construction of the control panel 73 may be of any usual form. As the form is immaterial to the present invention it is not deemed necessary to illustrate or describe the various parts thereof. It will be understood however that the arrangement shown is such that whenever the contact 12 which is carried by the bimetallic element 10 engages with the contact 13, the energizing circuit of the motor 75 is closed and whenever the contact 12 engages with the contact 14, the circuit of the motor 75 is interrupted. The motor 75 as illustrated diagrammatically is connected to the burner device 76 which, when it is started up heats the water in the furnace 77, the latter supplying the heating radiators of the house through the outlet 78 and return 79.

There are some well known forms of heating control panels which require only a single make and break contact master control thermostat. It will be apparent that with such panels, only contact 12 and contact 13 need be used to start up the furnace when these contacts engage and shut down the furnace when these contacts disengage.

The operation of the improved heating control of the present invention as illustrated in preferred form in the drawing is as follows: When the switch 34 is closed the motor 32 will be energized continuously from the alternating-current supply lines 33 and power also will be supplied therefrom to the control panel 73 so that the burner motor 75 may be energized by engagement of contact 12 with contact 13 to start up the furnace and deenergize to shut down the furnace by engagement of contact 12 with contact 14. It may be assumed that the manual adjusting knob 17 has been properly set to give the desired day or night temperature in the house; that knob 56 has been set to give the proper differential between the day and the night temperatures; and that knob 27 has been set to give the proper amplitude of oscillation to the cycling lever 23; and that the arms 41 and 42 have been set to effect the changeover from the day to the night temperatures at the desired time.

In Fig. 1, the contact 12 is shown in engagement with the contact 14 and under these conditions the motor 75 is deenergized and the furnace 77 is shut down. Still the heating action of the furnace may be continuing depending upon how long the furnace has been shut down and how great the heating inertia of the furnace and the heating system may be.

However, the motor 32 is continuously operating through the gear reduction 31 to rotate the timing cam 28 in the direction indicated by the arrow. As the cam 28 continues to rotate, it engages with the cycling lever 23 and operates this latter about the pivotal connection at the bottom thereof against the strain of the biasing spring 29. This motion of the cycling lever 23 is transmitted through the link 22 to move the thermostat supporting arm 11 about the shaft 21. Due to the overhang of the contact 12 below the shaft 21, this movement of the supporting arm 11 serves gradually to move the contact 12 out of engagement with the contact 14 and into engagement with the contact 13. This operation is indicated diagrammatically in Fig. 3 by the line A and is accomplished at a rate indicated by the slope of line $A_1$, the abscissa of the diagram representing time. During the period required to operate contact 12 into engagement with contact 13, the furnace is of course shut down. This period therefore may be termed a heat decreasing period as indicated by the letter $C_1$ in Fig. 3.

The period of time that the contact 12 is maintained in engagement with contact 13 is indicated by the dotted extension of the line $A_1$ above the dotted limit line 13'. During this period the bi-metallic strip 10 is flexed after the engagement of contacts 12 and 13, the strip 10 being sufficiently resilient to permit the continued movement of support 11. Also during this period the motor 75 is energized and the furnace 77 is started up to furnish heat to the house. This therefore may be termed a heat increasing period as indicated by the letter $H_1$.

When the timing cam 28 has been rotated sufficiently to permit the cycling lever 23 to drop off of the tip of the cam, the spring 29 immediately effects the return of contact 12 into engagement with contact 14. This operation is represented diagrammatically in Fig. 3 by the line $B_1$. The flexing of strip 10 after engagement of contacts 12 and 14 is represented by the dotted extension of line $B_1$ below the limit line 14'.

The cycling cam 28 as shown being of involute shape, it begins at once to return the cycling lever 23 to the left against the bias of the spring 29. However the contact 12 remains in engagement with the contact 14 for a substantial interval as indicated by the dotted portion of line $A_2$ below the line 14' in Fig. 3, due to the resiliency of the spirally wound bimetallic strip 10. During this interval the furnace remains shut down. This interval is indicated in Fig. 3 by the letter $C_2$ and continues even after the contact 12 has disengaged the contacts 14 and until contact 12 reengages contact 13. Thereupon the furnace 77 is again started up in the manner described above and the heat increasing period $H_2$ is obtained.

In this way the heating system is operated through successive cycles each including a heat increasing and a heat decreasing period, and having a frequency sufficiently high to neutralize or balance the heat increasing and heat decreasing inertia of the system and thereby maintain the ambient temperature of thermostat 10 at a predetermined value.

In case the weather or other conditions of the house should change so that the ambient temperature of thermostat 10 departs from the desired value which it has been set to maintain, the thermostat will respond to this departure. Assuming the ambient temperature decreases, the bimetal elements of the thermostat 10 are so arranged that the strip 10 slightly unwinds in accordance with the amount of departure. If this departure is sufficient, contact 12 may be moved by the thermostat 10 entirely independently of the cycling mechanism so as to engage with the contact 13 and thereby start the furnace up to supply more heat to the house. However with the cycling movement of contact 12 superimposed upon its movement by thermostat 10, this results in the contact 12 being operated jointly by the cycling mechanism and the thermostat so as to shorten the length of the heat decreasing periods and increase the length of the heat increasing periods as indicated by the letters $C^3$—$H^3$ in Fig. 3.

It will be observed from Fig. 3 that the heat decreasing periods $C_1$ and $C_2$ are both very much longer than the heat increasing periods $H_1$ and $H_2$ while the heat decreasing period $C_3$ is somewhat less than the heat increasing period $H_3$. The variation in the lengths of these periods in successive cycles is of course actually accomplished very gradually as the thermostat 10 unwinds only gradually in response to the variation in the house temperature.

While not indicated in Fig. 3, it is entirely possible upon an abnormal decrease of the ambient temperature from the desired value that any heating period H may be lengthened sufficiently by the unwinding action of thermostat 10 as to exclude the successive heat decreasing periods C entirely from the cycle. Under these conditions the furnace will be maintained in continuous operation since the oscillating movement of the cycling lever 23 is never quite sufficient to cause the limits of movement of thermostat 10 to include engagement of contact 12 with the contact 14. However, when the ambient temperature begins to increase due to the continued heating action of the furnace, thermostat 10 then responds to this variation and slightly rewinds itself thus shifting the limits of movement of contact 12 closer and closer to contact 14 during the successive oscillations of the cycling lever 23. Contact 12 will finally be brought into engagement with contact 14 to shut down the furnace when sufficient response of thermostat 10 to the temperature variation occurs. It will be apparent that during this period the cycling mechanism alternately increases and decreases the variation in ambient temperature that is required to cause thermostat 10 to effect the engagement of contact 12 with contact 14.

From the preceding description it will readily be apparent that whenever the ambient temperature rises above the desired value for which thermostat 10 is set, the heat decreasing periods will be lengthened materially and the heat increasing period shortened materially by the response of thermostat 10 to the variation. Likewise upon an abnormal rise in the room temperature the limits of cycling movement of contact 12 may be shifted by the winding up of thermostat 10 in response to the temperature variation so that contact 12 never is brought into engagement with the contact 13 by the cycling mechanism. Under these conditions the furnace 77 remains shut down continuously until thermostat 10 responds to vary the limits of cycling movement of contact 12 in accordance with a decrease in the ambient temperature.

Thus the limits of cycling movement to which the contact 12 may be operated by the cycling lever 23 are always controlled by and dependent upon the thermostat 10. However the spaced apart contacts 13 and 14 are made adjustable as shown in the drawing in order that their distance apart may be varied to conform to the limits of cycling movement of the contact 12 therebetween. In this way the distance between the lines 13' and 14' shown in Fig. 3 may be varied and thereby further modify the control obtained in the operation of the heating system. The limits of the cycling movement of contact 12 depend of course upon the mechanical linkage of the cycling mechanism. Provision is made for varying this linkage to control the limits of cycling movement of contact 12 by providing a series of holes in the lever 23 as indicated in the drawing, into any one of which the link 22 may be connected as desired. Furthermore, by varying the shape and size of the cam 28 as well as the speed reducing gearing 31, the rate and other characteristics of the cycles through which the furnace control is operated may be varied. For example, by simply reversing the direction of rotation of cam 28 and also the cam itself and then locating the cycling lever 23 on the opposite side of the cam, it is possible to reverse the slope of the cycles from that shown in Fig. 3. This same result may of course more readily be accomplished by simply reversing the connections 71 and 72 with the contacts 13 and 14. In these various ways the improved heating control device may be adapted to meet the particular heating inertia difficulties which may be encountered with any particular heating system. Various other modifications also will be obvious to those skilled in the art. For example, the link 22 of the cycling mechanism might just as well be connected to operate the contact supporting arm 15 instead of the thermostat supporting arm 11. Obviously the same results in controlling the heating system may be obtained in substantially the same way as above described.

While the motor 32 continues to operate the heating system through the cycles in the manner described above, the arms 41 and 42 are being continuously moved so as to effect the changeover from the day to the night temperature settings at the selected time. As indicated in the drawing the night changeover lever 42 is about to engage the pin 42a with the rounded head at the top of the main changeover lever 53. This operation will cause the shaft 21 to be shifted to the left thereby changing the setting of the thermostat 10 so that a lower temperature will be maintained in the house.

When the proper time arrives the pin 41a carried by the day changeover lever 41 will engage with the rounded head 50 at the end of the differential lever 52 so as to return the shaft 21 to its day position in which it is shown in the drawing.

Fig. 2 shows a modified arrangement which may be employed in case it is desired to coordinate the house temperature with the outside temperature. This is readily accomplished by mounting the lower end of the cycling lever 23 on the support 80 which is operated by the expansible bellows 81 connected to the bulb 82 containing a temperature responsive fluid. The bulb 82 is intended to be located outside the house so that when the outside temperature decreases, the bellows 81 contracts and its movement is transmitted through the support 80, lever 23, and the link 22 to the thermostat support 11 so as to set the thermostat 10 to hold a higher house temperature.

What I claim as new and desire to secure by Letters Patent of the United States, is:

1. In a heating system, the combination of means for heating having both heat increasing and heat decreasing inertia, a control therefor having a thermostatically actuated member oscillatable between a heat increasing and a heat decreasing position, and a timing device for periodically oscillating said control member between said positions at regularly recurring intervals of time sufficiently frequent to balance the inertia effects of said heating means.

2. The method of maintaining a substantially constant temperature comprising increasing the supply of heat when the temperature varies to a predetermined lower value, decreasing the supply of heat when the temperature varies to a predetermined higher value, and periodically varying said values in cycles having a frequency sufficiently high to stabilize the variations of the temperature.

3. The method of controlling a combustion heating system to provide a substantially constant temperature comprising increasing the combustion when the temperature varies to a predetermined lower value, decreasing the combustion when the temperature varies to a predetermined higher value, and periodically varying said values in cycles having a frequency sufficiently high to stabilize the variations of the temperature.

4. The method of controlling a combustion furnace house heating system to provide a substantially constant house temperature comprising starting combustion in the furnace when the house temperature varies to a predetermined lower value, stopping combustion in the furnace when the house temperature varies to a predetermined higher value, and periodically varying said values in cycles having a frequency sufficiently high to stabilize the variations of the house temperature.

5. A control for a heating system comprising a control member movable each way between a heat increasing position and a heat decreasing position, means including a continuously rotating timing cam for oscillating said member in realtively short recurring timed cycles, and temperature responsive means for controlling the position of said member between said positions to regulate the temperature.

6. A temperature control device comprising heating control mechanism having elements operable into a heat increasing position and into a heat decreasing position, temperature responsive means for operating said elements into said positions in accordance with the departure from a predetermined temperature and having adjusting means for determining said temperature, and timing means for periodically varying the temperature determined by said adjusting means in relatively short recurring timed cycles having a frequency sufficiently high to stabilize the departures from the predetermined temperature.

7. A temperature control device for a heating system comprising relatively movable control members having a neutral position between definite heat increasing and heat decreasing positions, timing means for periodically effecting oscillating relative movement of said members each way from said neutral position in relatively short recurring timed cycles, temperature responsive means for biasing the said members to a corresponding one of said definite positions independently of said timing means in response to predetermined variations of the temperature above and below a predetermined value, and means for varying said temperature value.

8. A heating control device comprising means responsive to variation in a temperature condition from a predetermined value for controlling the heating, and a timing device having a relatively rapid cycling means cooperating with the said control means for periodically varying the variation from said value required to effect operation of said control means and having a relatively slow cycling means cooperating with the control means for periodically varying said predetermined temperature value.

9. A control device for a heating system comprising a thermostat operable responsively to variation in a temperature condition of the system from a predetermined value for controlling the heating, and a timing device having a relatively rapid cycling means cooperating with the thermostat for alternately increasing and decreasing the variation from said temperature value required to effect operation of said thermostat and having a relatively slow cycling means cooperating with the thermostat for periodically varying said predetermined temperature value.

10. In a thermostat, the combination of a bimetallic element having a portion thereof movable gradually in response to changes in temperature, and means for superimposing a relatively rapid continuous cycling movement upon the gradual temperature change movement of said portion of the bimetallic element independently of temperature change.

11. In a switch for the regulation of a condition, comprising a circuit making and breaking switch having high and low position contacts, a floating switch member arranged to engage either the high or low position contacts, a device sensitive to variations from normal in said condition for operating said switch member, and means to intermittently reciprocate said switch member at predetermined intervals to cause intermittent contact at either the high or low position when said condition varies from a predetermined normal value, and means operated by said switch for maintaining said condition at a substantially uniform value.

12. In a switch for the regulation of a condition, comprising a floating switch member having circuit making and breaking contacts, two stationary contacts arranged to be engaged by the movable contacts when the switch member is moved out of a natural position, a device responsive to variations in said condition for operating the floating switch member one side or the other from its natural position, motor and means operated thereby for reciprocating the circuit making and breaking contact without making contact at either stationary contact position when the responsive device is in a natural position, and for intermittently contacting at either one or the other stationary contacts when said responsive device moves said switch out of its natural position, and means operated by said switch for maintaining said condition at a substantially uniform value.

13. A temperature control system of the class described comprising in combination, an electrical temperature controlling apparatus, a thermostat subjected to the temperature to be controlled, a contact controlled thereby, a cooperating contact, a circuit including said contacts and in control of said temperature controlling apparatus, a motor, and a cam operated by the motor for adjusting said thermostat, said cam cooperating with the thermostat so as to close said contacts for variable lengths of time which are proportional to the departure of the temperature from one of the limits of a zone within which it is permissible to allow the temperature to fluctuate.

14. A system of the class described comprising in combination, a thermally responsive element, a first contact, a second contact actuated by said element in the direction of said first contact for engagement therewith, means for continuously reciprocating one of said contacts towards and from the other independently of the action of said thermally responsive element, temperature changing means, and means associated with said contacts for rendering said temperature changing means operative and inoperative upon make and break thereof, said contacts remaining continuously open at temperatures higher than a first temperature and remaining continuously closed at temperatures below a second temperature lower than the first, and said contacts being intermittently opened and closed at temperatures between said first and second temperature with the effective time of closure varying directly with deviations from said first temperature.

15. A control system comprising a thermally responsive member, a heat control electric switch, a cam acting on the thermally responsive member to cause a periodic actuation of the switch at a time during each period, varying with variations in the temperature of the thermally responsive member while the temperature of said member is within predetermined limits, and to cause an actuation of said switch at an unvarying time during each period while the temperature of said member is outside said limits.

16. A temperature control system of the class described comprising, in combination, an electrical temperature controlling apparatus, a thermostat subject to the temperature to be controlled, a contact controlled thereby, a cooperating contact, a circuit including said contacts and in control of said temperature controlling apparatus, and means for closing said contacts for variable lengths of time to regulate the amount of heat supplied by the temperature controlling apparatus comprising a thermostat, a motor, and a cam driven by the motor for adjusting the thermostat.

17. A device of the class described, comprising, in combination, a thermostatic member, a contact controlled thereby, a second contact that cooperates with the first contact to control an electrical circuit, a supporting member for the second contact, a day-night shifting device for automatically shifting one of said members at predetermined times during the day and night, a manual device operatively connected to one of said members whereby the same may be manually shifted, a cam for cyclically adjusting one of the members within a relatively narrow range several times during the day and night, and a motor for operating said day-night shifting device and said cam.

DAVID C. PRINCE.